United States Patent
Doucette et al.

(10) Patent No.: US 7,844,957 B2
(45) Date of Patent: Nov. 30, 2010

(54) DEVELOPMENT SYSTEM WITH METHODOLOGY PROVIDING OPTIMIZED MESSAGE PARSING AND HANDLING

(75) Inventors: Michael W. Doucette, Aurora, CO (US); Joseph Krysinski, Castle Rock, CO (US)

(73) Assignee: Sybase, Inc., Dublin, CA (US)

( * ) Notice: Subject to any disclaimer, the term of this patent is extended or adjusted under 35 U.S.C. 154(b) by 1116 days.

(21) Appl. No.: 11/164,054

(22) Filed: Nov. 8, 2005

(65) Prior Publication Data

US 2007/0044069 A1 Feb. 22, 2007

Related U.S. Application Data

(60) Provisional application No. 60/595,962, filed on Aug. 19, 2005.

(51) Int. Cl.
*G06F 9/44* (2006.01)
*G06F 9/45* (2006.01)

(52) U.S. Cl. .................. 717/140; 717/105; 717/109

(58) Field of Classification Search .................. None
See application file for complete search history.

(56) References Cited

U.S. PATENT DOCUMENTS

| | | | |
|---|---|---|---|
| 5,339,430 A | 8/1994 | Lundin et al. |
| 5,341,478 A | 8/1994 | Travis et al. |
| 5,421,016 A | 5/1995 | Conner et al. |
| 5,430,876 A | 7/1995 | Schreiber et al. |
| 5,437,025 A | 7/1995 | Bale et al. |
| 5,511,199 A | 4/1996 | Anthias et al. |
| 5,590,334 A | 12/1996 | Saulpaugh et al. |
| 5,680,551 A | 10/1997 | Martino |
| 5,710,924 A | 1/1998 | Ayoub et al. |
| 5,715,394 A | 2/1998 | Jabs |
| 5,734,903 A | 3/1998 | Saulpaugh et al. |
| 5,742,848 A | 4/1998 | Burgess |
| 5,751,914 A | 5/1998 | Coley et al. |
| 5,758,159 A | 5/1998 | Collet |
| 5,925,108 A | 7/1999 | Johnson et al. |
| 5,953,404 A | 9/1999 | Fikis et al. |
| 6,041,306 A | 3/2000 | Du et al. |
| 6,047,323 A | 4/2000 | Krause |
| 6,311,215 B1 | 10/2001 | Bakshi et al. |
| 6,339,795 B1 | 1/2002 | Narurkar et al. |
| 6,347,342 B1 | 2/2002 | Marcos et al. |
| 6,418,400 B1 | 7/2002 | Webber |
| 6,668,284 B1 | 12/2003 | Parkhurst |
| 6,732,153 B1 | 5/2004 | Jakobson et al. |
| 6,766,368 B1 | 7/2004 | Jakobson et al. |
| 6,886,166 B2 | 4/2005 | Harrison et al. |
| 6,941,557 B1 | 9/2005 | Jakobson et al. |

(Continued)

*Primary Examiner*—Chuck O Kendall
(74) *Attorney, Agent, or Firm*—John A. Smart

(57) ABSTRACT

A development system with methodology providing optimized message parsing and handling is described. In one embodiment, for example, a computer-implemented method is described for improved processing of certain types of messages, the method comprises steps of: loading metadata at design time, the metadata characterizing a particular message type; based on the metadata, automatically generating source code for creating runtime components highly optimized for the particular message type; compiling the source code into the runtime components, for deployment in a runtime environment; and at runtime, processing messages of the particular message type with the runtime components, so that messages are processed in a manner that is highly optimized for the particular message type.

50 Claims, 10 Drawing Sheets

U.S. PATENT DOCUMENTS

| | | | |
|---|---|---|---|
| 6,968,538 B2 * | 11/2005 | Rust et al. | 717/108 |
| 7,050,797 B2 | 5/2006 | Jung | |
| 7,143,191 B2 | 11/2006 | Chuah et al. | |
| 7,284,048 B2 | 10/2007 | Jakobson et al. | |
| 2005/0005261 A1 * | 1/2005 | Severin | 717/108 |

* cited by examiner

DEVELOPMENT SYSTEM WITH METHODOLOGY PROVIDING OPTIMIZED MESSAGE PARSING AND HANDLING

CROSS REFERENCE TO RELATED APPLICATIONS

The present application is related to and claims the benefit of priority of the following commonly-owned, presently-pending provisional application(s): application Ser. No. 60/595,962, filed Aug. 19, 2005, entitled "Development System with Methodology Providing Optimized Message Parsing and Handling", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Appendix Data

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application. Object Description: SourceCode.txt, size: 1196568 Bytes, created: Ser. No. 11/07/2005 4:22:48 PM; Object ID: File No. 1; Object Contents: Source code.

BACKGROUND OF INVENTION

1. Field of the Invention

The invention relates generally to data processing environments and, more particularly, to those data processing environments that process messages.

2. Description of the Background Art

Computers are very powerful tools for storing and providing access to vast amounts of information. The first personal computers were largely stand-alone units with no direct connection to other computers or computer networks. Data exchanges between computers were mainly accomplished by exchanging magnetic or optical media such as floppy disks. Over time, more and more computers were connected to each other and exchanged information using Local Area Networks ("LANs") and/or Wide Area Networks ("WANs"). Initially, such connections were primarily amongst computers within the same organization via an internal network.

More recently, the explosive growth of the Internet has provided access to tremendous quantities of information from a wide variety of sources. The Internet comprises a vast number of computers and computer networks that are interconnected through communication links. In order to make the best use of these resources, various protocols have been developed. Health Level Seven (HL7), for example, is one of several American National Standards Institute (ANSI)—accredited Standards Developing Organizations (SDOs) operating in the healthcare arena. Health Level Seven's domain is clinical and administrative data pertinent to healthcare. "Level Seven" refers to the highest level of the International Organization for Standardization (ISO) communications model for Open Systems Interconnection (OSI)—the application level. The application level addresses definition of the data to be exchanged, the timing of the interchange, and the communication of certain errors to the application. The seventh level supports such functions as security checks, participant identification, availability checks, exchange mechanism negotiations and, most importantly, data exchange structuring. HL7 is responsible for maintaining guides for HL7 messages that can stand-alone or be embedded within ASC X12N transactions. As such, HL7 addresses the movement of messages in a healthcare environment, including the representation of the connections that exist between the information carried in the fields of HL7 messages.

HL7 is but one example of a messaging environment. Other examples include enterprise application integration (EAI), business process management, database messaging, real-time systems (e.g., satellites and monitoring devices), and wireless communication. As is the case with HL7 messages, these environments entail the movement of business application data in a given environment. This type of information typically includes a defined standard or format, and employs metadata.

Most messaging systems tend to employ generic engines that at runtime discover information about what the given message is, including using metadata at runtime in an interpreted fashion. Thereafter, individual messages may be parsed. The generic approach has a major disadvantage in that the implementation (of a generic engine) requires a relatively large amount of conditional logic (i.e., executable program logic) to handle all the various scenarios that exist. This additional conditional logic requires additional processor (CPU) and memory resources. As most of this processing turns out to not be required for the given task at hand, the generic approach ends up providing a highly inefficient solution. As a result, disadvantages encountered include the following: performance insufficient for high-volume messaging; underutilization of platform; inadequate performance; limited environments supported (e.g., implemented in non-portable programming language); and unnecessary data normalization (e.g., unnecessary code set conversion and unnecessary integer endian-format conversion).

At the same time, however, there is increasing customer demand in the EAI market place for better performance, so that businesses have quicker access to the business processes and information necessary for efficiently running one's business. Additionally, given ever-present economic constraints, business customers also demand better utilization of hardware platforms that they have already invested in (i.e., computer hardware, operating system, and application environments, such as J2EE). Presently, existing systems are widely viewed by customers as not meeting these demands.

One attempt to address the foregoing is a brute-force hardware upgrade. This includes increasing memory of the host system, increasing CPU speed of the host system, and increasing the number of CPUs on the host system. However, even with ever-increasing hardware performance available, the brute-force approach has not provided a solution that is sufficient for customers' demands. Other attempts have focused on "fine tuning" or caching schemes, including: tune supporting software (i.e., database (e.g., indexes, tuning), operating system); cache message buffer space (avoiding costly system calls to allocate memory); preload and cache message definition metadata (e.g., memory-resident metadata); and cache message definition metadata (avoid overhead); and tune host application (e.g., caching parsers). Fine tuning may include manually crafting individual components by hand (i.e., manual coding), in an effort to optimize a particular deployment's processing.

These attempts have their own problems. As these attempts do not address the underlying problem (of inefficient generic program logic), these attempts lead to inefficient utilization of the given underlying platform. The generic nature of these solutions diminishes potential performance, as the solutions do not address wasteful processing and do not take full advantage of what is known at design-time. The generic nature largely disregards real-world usage, and squanders an opportunity to leverage a given customer's knowledge of messages likely to be received for processing. Although the manual crafting of individual components may optimize a given deployment, developing components by hand is time consuming, expensive, and error-prone. As a result of these disadvantages, existing systems do not scale well. Accordingly, a better solution is sought.

SUMMARY OF INVENTION

A development system with methodology providing optimized message parsing and handling is described. In one embodiment, for example, a computer-implemented method of the present invention is described for improved processing of certain types of messages, the method comprises steps of: loading metadata at design time, the metadata characterizing a particular message type; based on the metadata, automatically generating source code for creating runtime components highly optimized for the particular message type; compiling the source code into the runtime components, for deployment in a runtime environment; and at runtime, processing messages of the particular message type with the runtime components, so that messages are processed in a manner that is highly optimized for the particular message type.

In another embodiment, for example, a computer-implemented system of the present invention providing optimized processing of messages is described that comprises: metadata, available at design time, for characterizing a particular message type; a designer module for generating source code in response to the metadata, the source code for creating runtime components highly optimized for the particular message type; a compiler for compiling the source code into the runtime components; and a runtime environment for deploying the runtime components, wherein messages of the particular message type are processed in a highly optimized manner by the runtime components.

In yet another embodiment, for example, an improved method of the present invention is described for processing messages, the method comprises steps of: analyzing metadata at design time for a particular message type; based on the metadata, dynamically generating message handling components that are highly optimized for the particular message type; and deploying the dynamically generated message handling components in a runtime environment, such that messages having the particular message type are handled in a highly optimized manner.

In another embodiment, for example, a method of the present invention is described for dynamically creating customized message processing components, the method comprises steps of: passing information about a particular wire format to a parser generator, which creates a first set of source code for a customized parser component; passing the information to a serializer generator, which creates a second set of source code for a customized serializer component; compiling the first and second sets of source code, for generating runtime versions of the customized parser and the customized serializer; and wherein the customized parser and the customized serializer may be deployed for optimized processing of messages utilizing the particular wire format.

In still another embodiment, for example, a system of the present invention is described for processing messages that comprises: metadata for a particular message type; code generation modules for automatically generating, based on the metadata, message handling components that are highly optimized for the particular message type; and a runtime environment that employs the components for processing messages of the particular message type in a highly optimized manner.

In another embodiment, for example, a system of the present invention for dynamically creating customized message processing components is described that comprises: a parser generator for creating a parser component customized for a particular wire format; a serializer generator for creating a serializer component customized for the particular wire format; and a runtime environment for deployment of the parser component and the serializer component, so that messages of the particular wire format are processed by components specifically customized for that wire format.

DETAILED DESCRIPTION

Glossary

Figure 1:
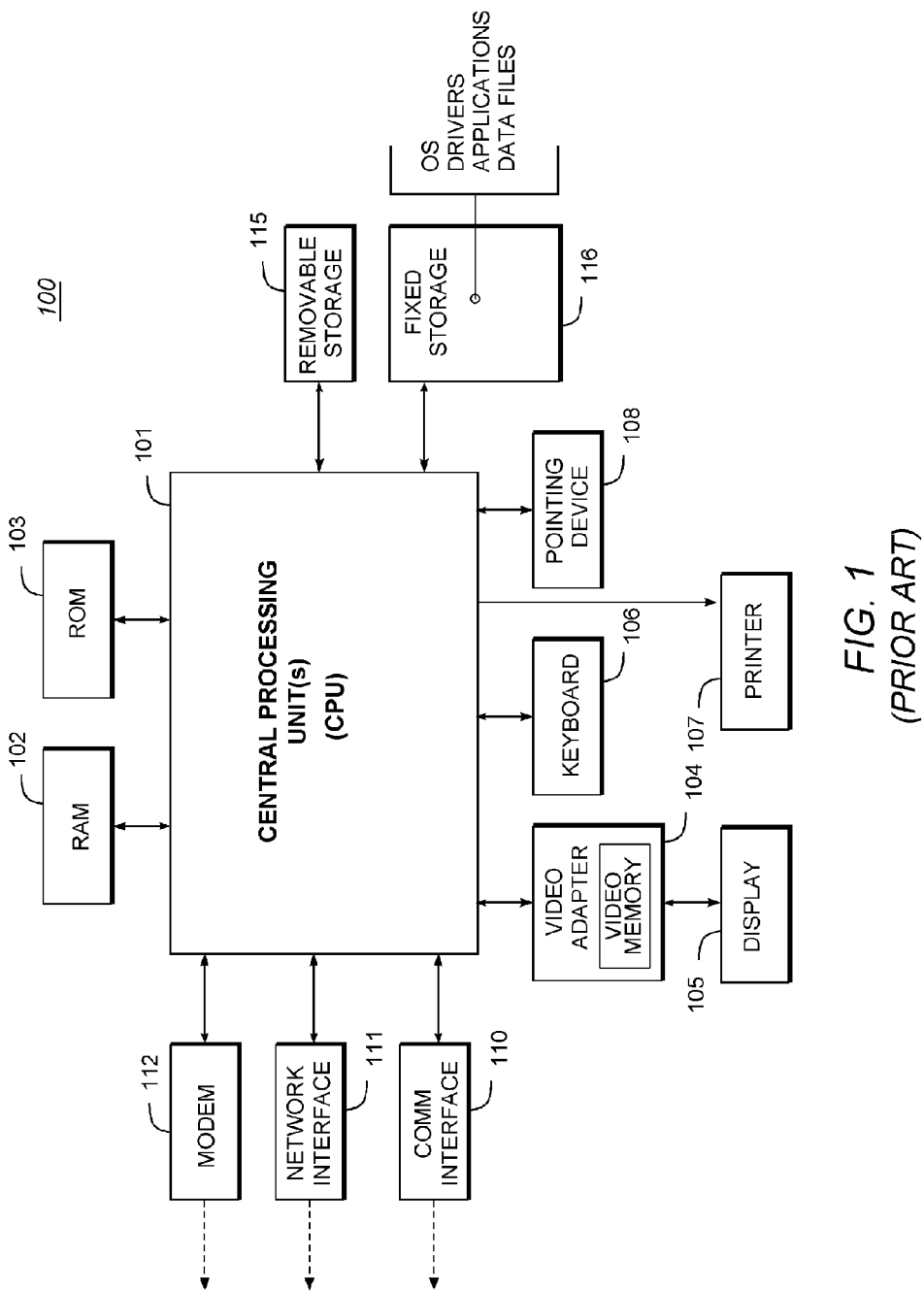
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Coded Character Set: A character set in which each character is assigned a numeric code value. Frequently abbreviated as character set, charset, or code set.

Data Scrubbing: Data scrubbing is the process of fixing or eliminating individual pieces of data that are incorrect, incomplete, or duplicated before the data is passed to a data warehouse or another application.

Data Validation: A process used to determine if data is accurate, complete, or meets specified criteria.

DOM: Short for Document Object Model, the specification for how objects in a Web page (text, images, headers, links, etc.) are represented. The DOM defines what attributes are associated with each object, and how the objects and attributes can be manipulated.

Eclipse: The Eclipse Platform is designed for building integrated development environments (IDEs) that can be used to create applications as diverse as web sites, embedded Java programs, C++ programs, and Enterprise Java Beans.

Format: A metadata description for a message type

JIT: JIT or Just-in-time refers to processing that occurs at the moment is necessary.

Message Type: A specific message (e.g., A07 HL7 2.4 message).

Parser: A software component that takes a serialized object and converts it into an in-memory object (e.g., DOM or Java object).

Serialized Form: A buffer representation of an object.

Serializer: A software component that takes an in-memory object and converts it to a serialized form.

WFAPI: Wire Format API provides a means to read, write, and construct wire format definitions (WFIM).

WFIM: Wire Form Intermediate Model describes the logical and physical attributes of a Format. The logical attributes of the Format are stored in an XML Schema that is referenced from a WFIM file.

Wire format: The physical attributes of a message. These attributes include data types, tags, field delimiters, container delimiters, coded character set, etc.

XSD: XML Schema Definition.

XML: Short for Extensible Markup Language, a specification developed by the W3C. XML is a pared-down version of SGML, designed especially for Web documents. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium (www.w3.org), the disclosure of which is hereby incorporated by reference. The specification is also available on the Internet (e.g., currently at www.w3.org/TR/REC-xml).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
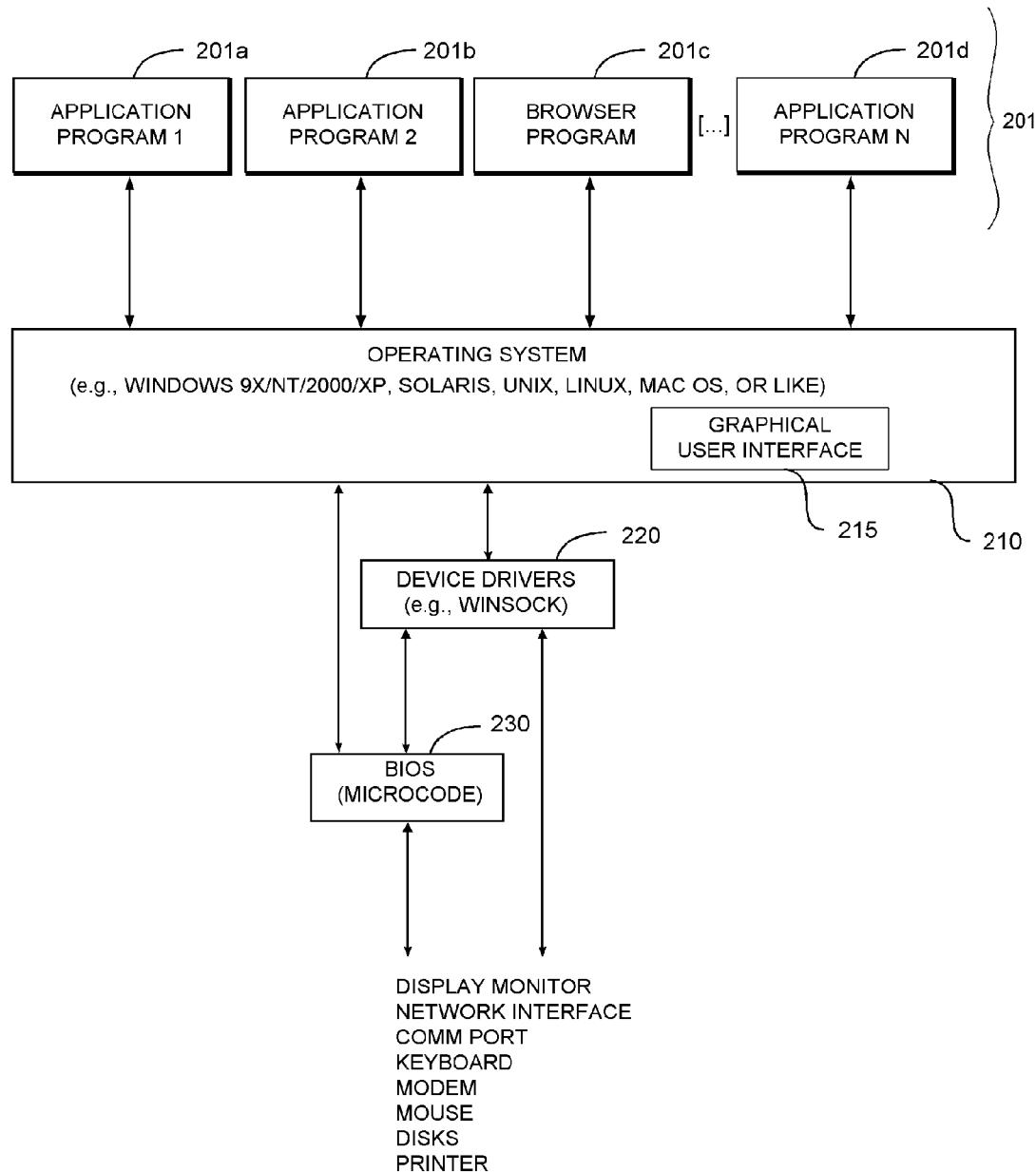
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Overview

In accordance with the present invention, the generic engine approach is eschewed in favor of an approach employing specialized components. In particular, dynamically created components are utilized and thus are very specific (i.e., customized) for—and thus highly optimized for—the types of data that they will be processing. Central to any messaging system is the ability to parse serialized data and transform in-memory data objects into serialized messages. The components of the system of the present invention provide this capability in a manner that can be utilized in a variety of applications. For example, message parsers and serializers can be integrated into technologies such as message brokers, business process integration servers, extract-transform-load solutions, data replication, wireless messaging, database messaging, and the like.

During design time usage of the system by the developer (user), these components are designed, tested, and generated within a graphical user interface known as the Message Designer, which allows the developer to compile at design time everything that he or she knows about the metadata of the target message format (thereby eliminating unnecessary conditional code and unnecessary conversion of metadata). Metadata itself refers to data about data, which is used to capture the logical and physical structure of a message (e.g., what elements exist in a message, what are their data types, what the data's cardinality is, tags, delimiters, and the like). The metadata may be the pre-existing data that describes the logical and physical structure of a given message format, or may be discerned from self-describing data (e.g., XML files). In either case, the metadata itself is represented in an XML markup file in the currently preferred embodiment.

In order to achieve increased performance, the system of the present invention adopts an approach that moves away from generic metadata driven engines to optimized components, which are generated by translating metadata into an executable form. As a result, conditional logic is restricted to the dynamic nature of the run-time data. For example, if an element repeats in an unbounded fashion (i.e., unknown at design time), conditional logic must exist to loop through instances of the repeating data. However, any information that is known at design time will be manifested in code in a highly efficient manner. Unnecessary conversion of elements of metadata, such as tags and delimiters, is eliminated. Further, the coded character set of the message format is recognized and captured at design time, thereby eliminating the need to query that through some means at runtime.

As a further optimization in the system of the present invention, the generated components perform just-in-time work. For example, as message data arrives over the wire in a particular form, the components leave that data in that particular form until the moment that that data is actually needed to be in a different form. For example, data validation is not performed unless it is necessary. Similarly, data formatting is not done until necessary; for example, changing decimal format, date format, and character set conversion are not performed until necessary. In most cases, the data may be left alone (i.e., does not need to be normalized) and may instead be forwarded to other systems in its present format.

The system does not maintain unnecessary copies of parsed data. For example, when a system parses messages, it will often create a duplicate of the data that has been parsed (e.g., by maintaining a message buffer of parsed data, and maintaining an in-memory representation of that buffer). That approach is inefficient, as it uses far more memory than is required. The system of the present invention, in contrast, employs a memory-efficient approach that maintains only a single buffer and instead uses references to point into buffer positions; items may be indexed as well.

The approach of the present invention may be summarized as follows. Rather than load metadata describing messages at run-time, the system of the present invention uses metadata as source to generate executable code. Anything that is captured in metadata is compiled into code, thereby eliminating unnecessary conditional code. Literal values are converted into the precise binary form required at run-time and are included in the generated code. The system eliminates wasteful run-time processing by deferring unnecessary conversions and formatting, such as JIT data type conversion, coded character set conversion, JIT validation, and JIT data formatting. Unnecessary copies of parsed data are not kept (in contrast to prior art systems). Data may be inserted and retrieved in a direct manner (e.g., direct get and set access operations), thereby avoiding less efficient approaches (such as tree traversal in a DOM). All told, the present invention avoids the prior art approach of loading metadata at runtime and processing messages in a generic, but highly inefficient, manner.

System Components

General

Figure 3:
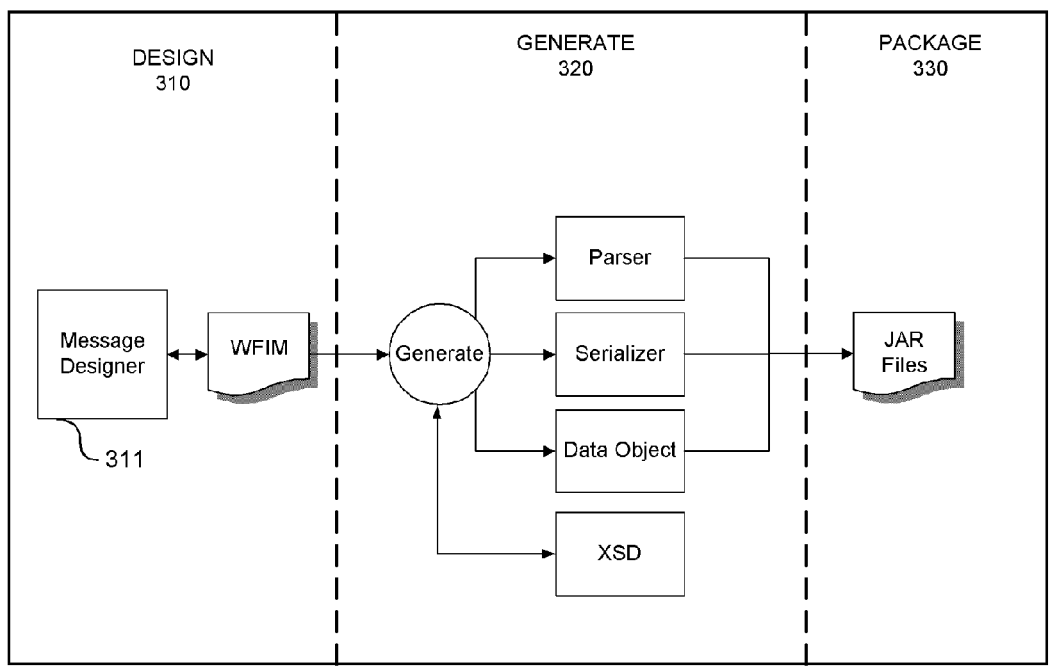
FIG. 3 is a simplified block diagram illustrating design-time functionality of the system of the present invention.

Overall system design is perhaps best described in terms of design-time and run-time system architecture and operation. FIG. 3 is a simplified block diagram illustrating design-time 300. Conceptually, the design-time involves three processes: component design and construction 310, build/generate and test 320, and packaging 330. During the component design and construction process, the user creates message definitions with a Message Designer 311. The Message Designer 311 allows the user to capture metadata that defines the characteristics of serialized data. With this metadata, the user can generate parsers, serializers, and data objects. Once the design process is complete, the user can test components. Prior to generating these components, the user sets preferences which affect the build. These preferences include logging, validation, and performance instrumentation. The deployable unit generated by the design-time tools is a set of JAR files in the currently preferred embodiment. Java class files are packaged as JAR files using standard tools. The Message Designer does not include other deployment tooling in the currently preferred embodiment, as generated components may be used in products with very different run-time environments.

Runtime

Figure 4:
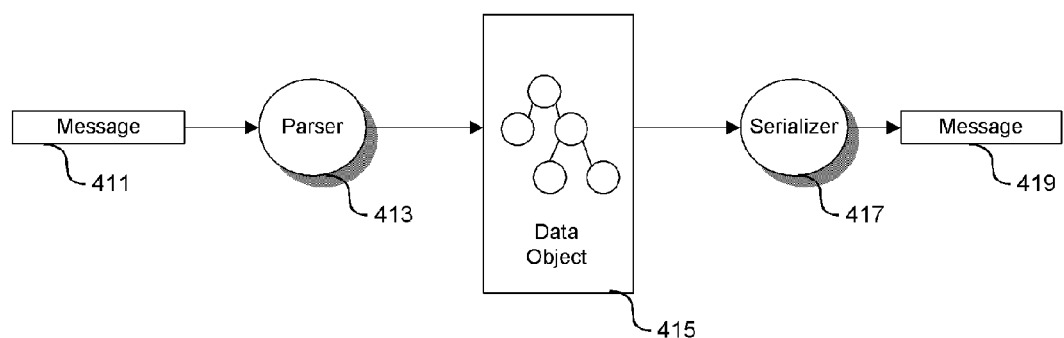
FIG. 4 is a simplified block diagram illustrating runtime functionality of the system of the present invention.

Runtime 400 is illustrated in FIG. 4. As shown, it involves parsing and serialization of data (use of the packaged components). Messages (e.g., message 411) are "handed" to parsers (e.g., parser 413) based on type. For example, an HL7 A07 message would be handed to a parser built specifically for that message type. As the parser processes the message, it generates events that are passed to a populator. The populator "knows" the data object and how events should be processed. At the end of a parse, a valid data object 415 should exist. Serializers (e.g., serializer 417) take a single data object as input and produce a serialized representation of the object, as output message 419. A serialized buffer is employed that conforms to a wire format specification detailed in the Message Designer (e.g., types, tags, delimiters, padding, field length, and the like).

Message Designer Environment

Figure 5:
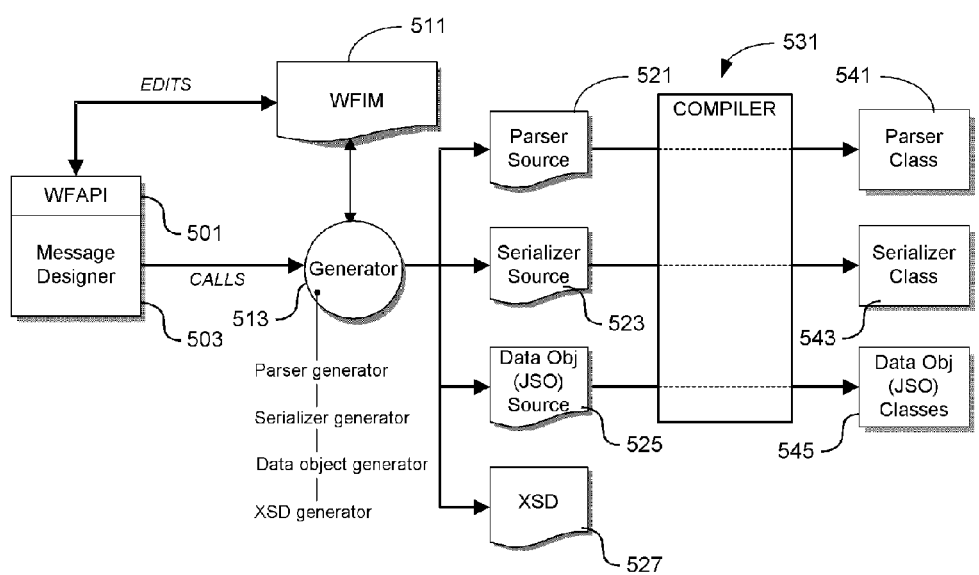
FIG. 5 is a block diagram illustrating a Message Designer environment, including the inputs, outputs, and interfaces.

FIG. 5 is a block diagram illustrating Message Designer environment 500, including the inputs, outputs, and interfaces. The Message Designer 503 serves as the user interface used to define wire formats, and generate class files for parsers, serializers, and data objects. The Message Designer 503 includes an interface that allows the user to supply logical and physical information describing a message type through an intuitive user interface. The logical structure consists of groupings of container elements, terminal elements, and attributes. These groupings can be sequenced, alternative, or random. In addition, the logical structure defines the cardinality of each element. The physical attributes of a message describe the means by which data can be identified, extracted from the message, and validated. These attributes include tags, delimiters, lengths, patterns, data types, coded character set, data formats, and more. The Message Designer provides a graphical user interface that allows both of these types of data to be collected and persisted. In this manner, the Message Designer 503 allows the user to define parser and serializer metadata (WFIM and Content Model), and generate the run-time artifacts (e.g., Java Schema Object, described below).

The WFAPI 501 is the Wire Format Application Programming Interface. It is used to read, write, and validate wire format definition files (WFIM files). The WFIM (Wire Format Intermediate Model) 511 is the metadata that describes the applicable wire format. The metadata includes information such as structure, data types, cardinality, tags, delimiters, and the like. The WFIM 511 serves both as input and output of the Message Designer 503. In the currently preferred embodiment, WFIM information is passed as an XML document that describes the logical and physical attributes and the wire format. Supported wire formats in the currently preferred embodiment include: Custom Wire Form, XML, HL7, X12, EDIFACT, SWIFT, and FIX.

The Generator 513 represents generators for parsers, serializers, data objects ("Java Schema Objects"), and XSDs. During system operation, the Message Designer calls a parser generator, passing it a WFIM (object), leading to the generation of parser source, which is in turn compiled into a parser class. It calls separate generators for the serializer and the data object. During the generation process, a WFIM is passed to a generator which produces an XSD (e.g., XSD 527). The XSD serves as input to serializer and data object generation. The XSD is also used to model data objects in applications that use this technology (e.g., Business Process Management System). Similarly, a serializer generator is called. Input to the serializer generator is an XSD and a WFIM file. The output of the generator is a Java source code file which is subsequently compiled into a serializer class. Finally, a Java Schema Object (data object) generator is called. The input is an XSD. The generator produces Java code for the data object, which is then compiled, creating compiled data object classes.

The Parser Source 521 represents the Java code generated by the parser generator. This comprises the Java source representing the logic needed to parse the message defined by the Message Designer. Similarly, the Serializer Source 523 represents the Java code generated by the serializer generator. This Java source represents the logic needed to serialize the messaged defined by the Message Designer. In the currently preferred embodiment, one Java (.java) file is generated for each parser and for each serializer. The Java Schema Object (Data Object) Source 525 represents the Java code generated by the data object generator. There may be one or more Java (.java) files generated per data object. The Compiler 531 is a Java compiler (such as provided in the Java JDK). The compiler takes the foregoing Java source files as input and produces the desired respective Java classes. These compiled classes are in turn instantiated at runtime as runtime objects: Parser 541, Serializer 543, and Java Schema Object 545.

Java Schema Object (Data Object)

The Java Schema Object (JSO) 545 will now be described in further detail. As described above, the JSO is a runtime data object. Like the parsers and serializers, the Java Schema Object is generated for a specific application. The source metadata for a Java Schema Object is an XML Schema file, which provides the structure of the data and the data types (or the closest approximation). It is populated by generated Parsers, and it is serialized by the generated Serializers. The Java Schema Object can be quickly populated and data can be retrieved very quickly. Although the JSO is currently implemented as a Java object, those skilled in the art will appreciate that the data object could be implemented with similar technologies, such as XML Beans or Java Architecture for XML Binding (JAXB). Regardless of its particular implementation form, the data object should allow for the storage of "raw" data (i.e., not require data normalization) and it should provide direct access without the need to do expensive tree traversals.

Example Message Type

Figure 6:
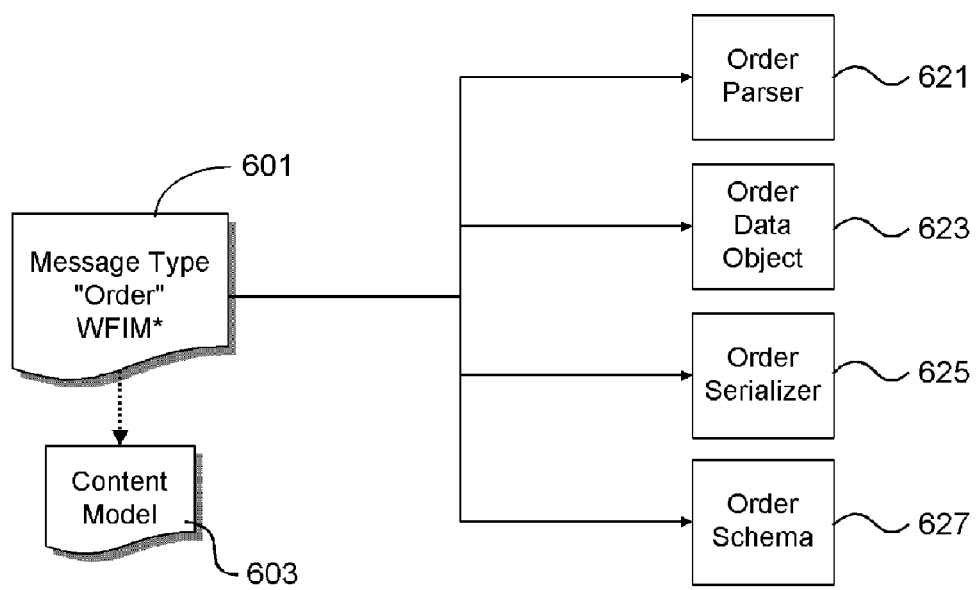
FIG. 6 is a simplified block diagram illustrating specialized derivatives that may be generated.

FIG. 6 is a simplified block diagram 600 illustrating specialized derivatives that may be generated. Here, the parser 621, serializer 625, and data object 623 are generated specific to a particular wire format, represented by message type "Order" in WFIM document 601. XML Schemas, such as the Order Schema 627 in FIG. 6, are generated during parser/serializer generation. They are used for data object generation (e.g., Java Schema Object) and for Serializer generation. XML Schemas also provide a necessary element of metadata for integration into other applications. For example, data used within a BPM (Business Process Management) solution is often described using XML Schemas.

The WFIM document 601 is linked to a content model file 603 that describes the logical model of the "Order" message type. The parser 621 is built specifically to parse a message that conforms to the definition described in the WFIM 601. Like the parser 621, the serializer 625 is built specifically to serialize a message with the physical attributes described in the WFIM 601. The data object 623 generated is built specifically to hold the data extracted at parse time or needed for serialization.

Recall that the data object in the currently preferred embodiment is implemented as a Java Schema Object (JSO). The JSO serves as the data container that is populated by the generated parsers and serialized by the generated serializers. Its part in code generation is simply to provide the necessary getters and setters. These getters and setters provide direct access to data without the need to do a tree traversal (e.g., DOM). Thus, the JSO is both a runtime container and a part of code generation. Although the JSO is the current data container, another data container can be used as long as it provides direct access to data for setting and retrieving data.

Wire Format Metadata API (WFAPI)

A Wire Format Metadata API is provided for reading and writing WFIM files. In addition, it provides a means by which applications (such as the Message Designer) create and modify wire format metadata.

Parsers (a) General

Parsers are message type specific runtime components. During the earlier parser generation process (that creates the runtime parser), wire format metadata is read and translated into optimized code, which ultimately is compiled to generate a given runtime parser. In order to simplify the generation of message type specific parsers, a common Parser API is provided for implementing behavior common across different message types. Parser code logic may be partitioned into two groups of code: the Serializer API and the code produced by the Serializer Generator.

During runtime operation, a parser receives messages in buffer form, whereupon it parses that buffer to produce a data object containing message data. Specifically, a given parser takes as input a message buffer for its specific message type (i.e., a serialized data object with a well-defined physical form), and then proceeds to populate a message type specific data object. As the parser identifies elements of data, events are generated. The events are passed to the data object via a "populator" mechanism. The data object represents the in-memory representation of the message buffer.

(b) Parser Generator

Figure 7:
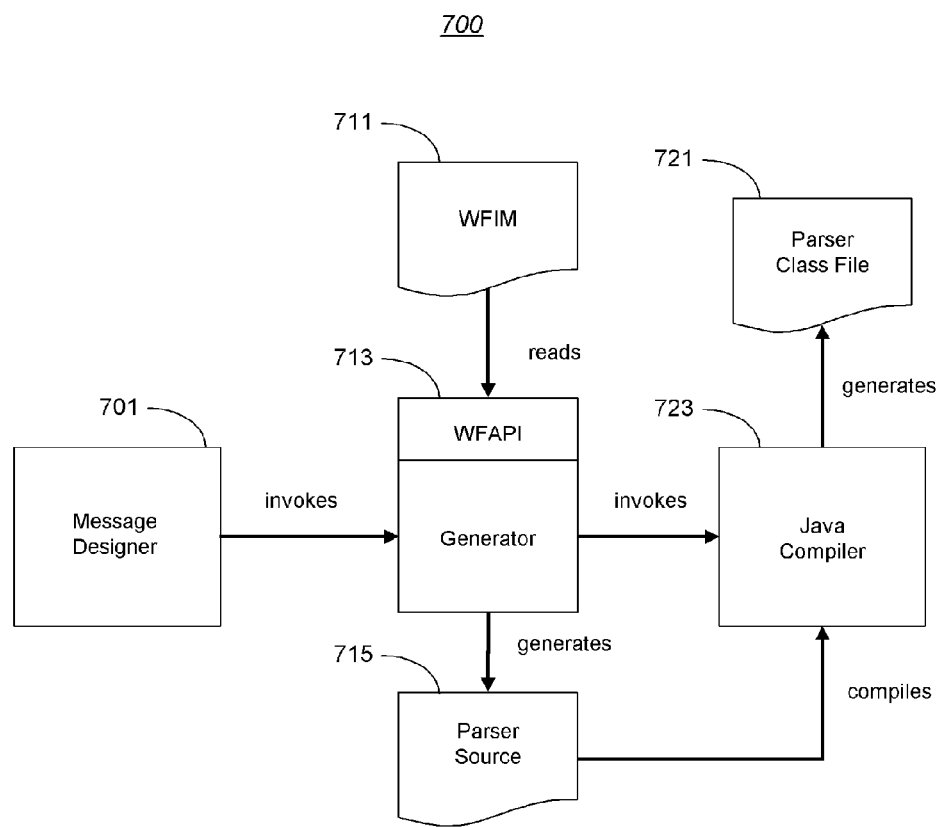
FIG. 7 is a block diagram illustrating interfaces of the system that allow the Message Designer to invoke the Parser Generator Engine, passing it preferences and the location/name of the Wire Format Metadata File.

As illustrated in FIG. 7, the system 700 includes interfaces allowing the Message Designer 701 to invoke the Parser Generator Engine 713, passing it preferences and the location/name of the WFIM 711. Given the URI of the WFIM, the Parser Generator retrieves the wire format metadata. The generator 713 then builds the parser source 715 using the preferences specified by the user. Once the Parser Generator constructs the Java source (715) for the Parser, it invokes the Java compiler 723, which produces the necessary compiled parser class files 721 for runtime.

Serializers (a) General

Generated serializers are message type specific components that take a data object as input and produce a serialized message with the appropriate wire format. Thus, a given message type specific serializer takes a message type specific data object as input, and produces the serialized form of the data object, which is then placed in the data buffer. Like parsers, the serializers included code logic that may be partitioned into two groups of code. The majority of the serializer logic is based on a Serialization API; the Serializer Generator produces a thin layer of code on top of the Serialization API.

(b) Serializer Generator

Figure 8:
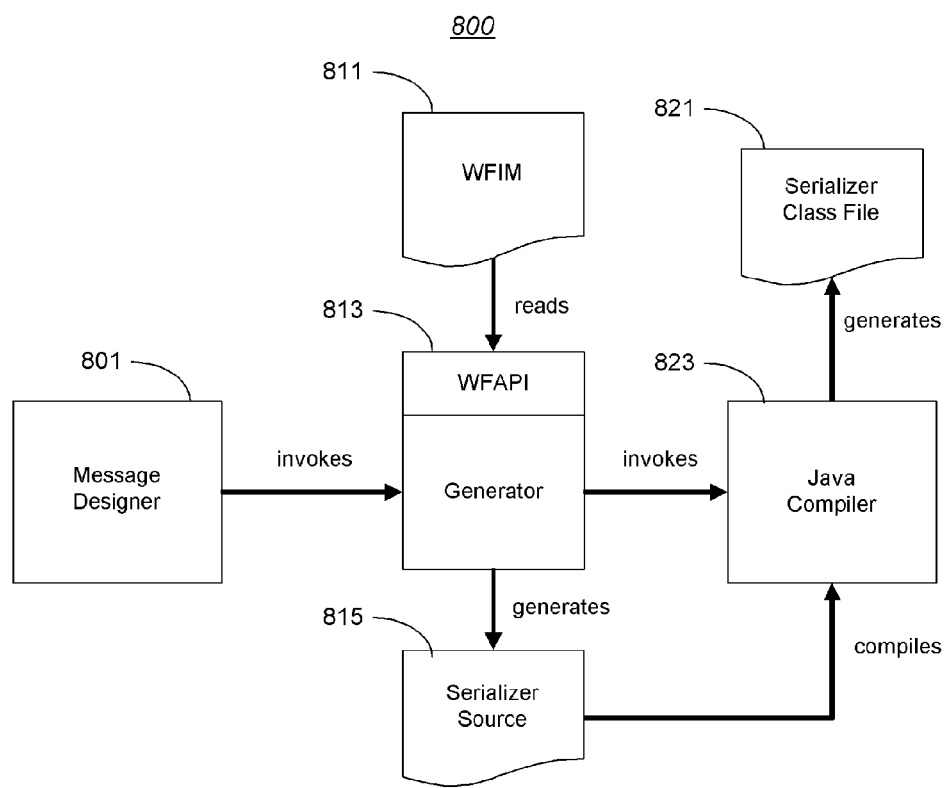
FIG. 8 is a block diagram illustrating interfaces for serializing.

The system 800 includes interfaces for serializing, as illustrated in FIG. 8. The Message Designer 801 invokes the Serializer Generator Engine 813, passing it preferences and the URI of the WFIM 811. Given the URI of the WFIM, the Serializer Generator Engine 813 retrieves the wire format metadata. The Serializer Code Generator reads a wire format definition (i.e., detail the attributes of a message type) and produces a serializer for that specific wire format. The XSD name and location are provided in order to provide code generation capabilities related to data extraction from the data object.

Using the preferences specified by the user and the WFIM, the Serializer Generator Engine 813 builds the serializer source 815. Here, the Serializer Generator Engine 813 produces a Java source file (815) representing source code of a message specific serializer. Once the Serializer Generator Engine 813 constructs the source for the Serializer, it invokes the Java compiler 823, which produces the necessary compiled class file(s) 821 for runtime. The now-generated serializer includes the features specified by the preferences (e.g., coded character set, performance instrumentation, etc.). A separate generator produces class files representing the data object consumed by the aforementioned specific serializer.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server). The Eclipse Platform may be used for editing and compiling the Java programs below.

Figure 9:
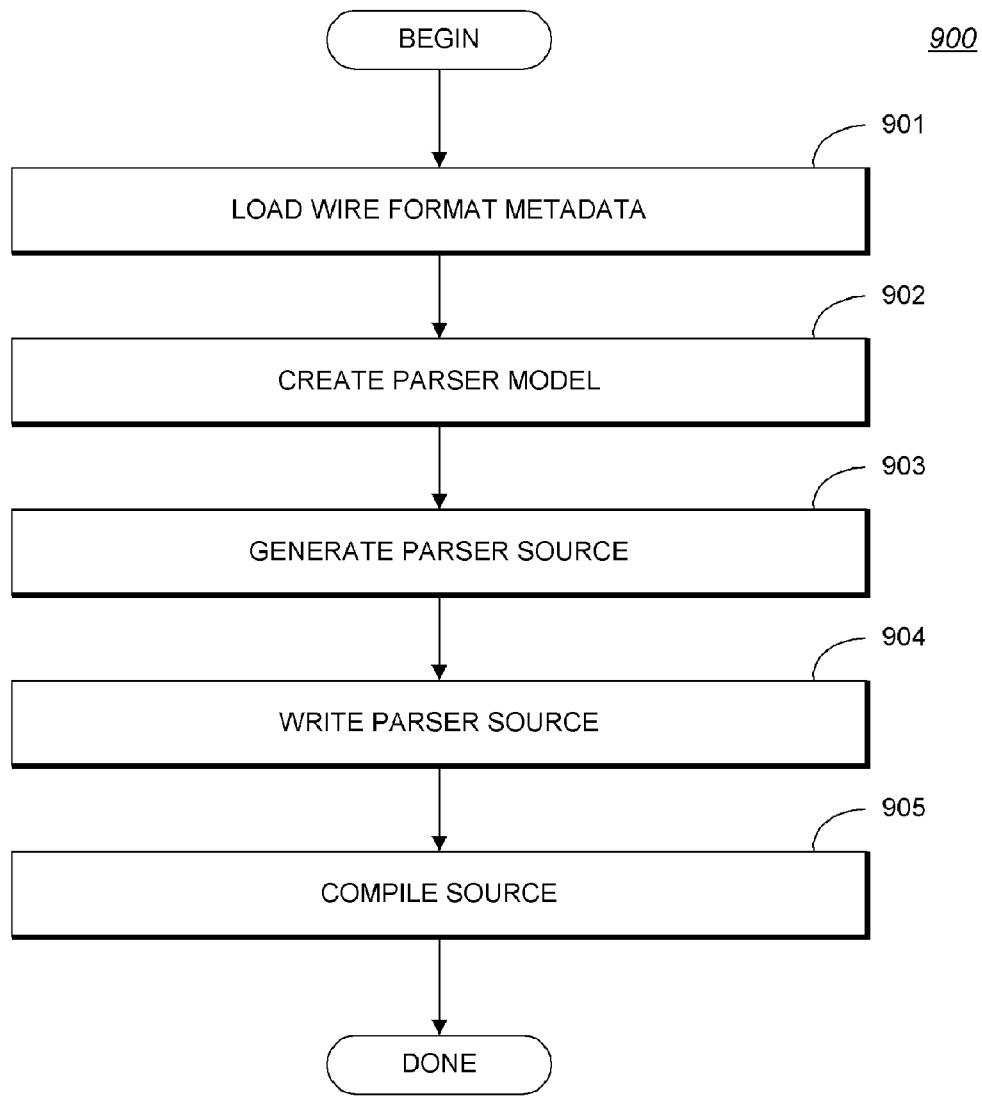
FIG. 9 is a high-level flowchart illustrating a method of the present invention for parser generation.

FIG. 9 is a high-level flowchart illustrating a method 900 of the present invention for parser generation. Execution of the method occurs in the following context. As previously described, the Message Designer is the means by which the user defines message definitions. The end result of that is a WFIM file which is written through the Wire Format API, such as illustrated in FIG. 5. At the point when it is time to actually generate a parser, the system of the present invention loads the wire format metadata from the WFIM file, as indicated by step 901. In the currently preferred embodiment, this is achieved by passing the name of the WFIM (XML) file to WFIM parser logic in the system's parser generator, which in turn loads the metadata. This loading is accompanied by a validation process where the method validates that the wire format metadata is complete. From the loaded metadata, a parser model may now be created in memory, as indicated by step 902. Specifically, the parser generator iterates through the metadata to create a generic parser model which is then populated with all of the wire format metadata attributes (for the particular message type under consideration). These include both logical and physical attributes of the wire format. The logical attributes include the wire format's structure, the basic data types, the cardinality, and the like. The physical attributes include specific data types, such as endian type (i.e., big-endian versus little-endian), float (precision) type, string data type, and the like.

The model for a particular message may be represented as a hierarchical structure in memory having a root node with several associated attributes or children. The root node represents the message in its entirety, and the children represent the various parts of the message. For example, given a purchase order message, the purchase order root node may be called "purchase order" which in turn has different children such as "account number", "order date", "order items", and the like. Individual children may have their own attributes, such as specific data type (e.g., String or date/time), tag(s), delimiter, "repeating" versus "nonrepeating", and so forth. In this manner, everything about a specific wire format may be captured by this in-memory model.

Once the model has been created, the system is now ready to pass the model on to the parser generator which iterates through the model generating the corresponding parser source code in a buffer, at step 903. In the currently preferred embodiment, the source code is generated using the Java programming language. However, those skilled in the art will appreciate that the method may be implemented using programming languages other than Java, such as C, C++, C#, Visual Basic, or the like. Code generation proceeds using tree traversal technique as follows. Starting with the root node which itself has particular attributes, the method generates code that represents parsing of the root node. For example, root attributes include information about the message encoding and locale, and the method therefore at this point generates parser source corresponding to those attributes.

In this manner, the method at this point may iterate through the model and generate snippets of source code for the various nodes and attributes present in that model. Should the method detect any missing mandatory attributes or other errors in the metadata during this iteration, it may report those to the user for input or correction. The generation of source yields a buffer that comprises an entire Java source code file, which in turn represents the particular parser of interest (for the given wire format under consideration). After generation is complete, the source buffer is written to the file system, as indicated by step 904. Subsequently, the source code file (Java) may be compiled into a Java class (.class) file, as indicated by step 905. Throughout the generation and compilation method steps, the Message Designer monitors processing and reports back to the user any errors detected.

By way of example, a parser "generate" method may be constructed as follows, for creating program code for parsing a tag and data field:

```
 1:  public StringBuffer generate(TagAndDataField component) {
 2:
 3:      StringBuffer buffer = new StringBuffer( );
 4:
 5:      // Generate method for tag parsing based on tag type
 6:      // This include converting the tag into its run-time format
 7:      StringBuffer tagMethod = component.tag.generate(this);
 8:
 9:      // Generate termination method this includes the conversion
10:      // of literal values (e.g. delimiters) to its run-time format
11:      StringBuffer terminationMethod =
component.termination.generate(this);
12:
13:      // Generate inline comments
14:      buffer.append("\n");
15:      buffer.append(indent( ) + "// Tag and Data Field (\"" +
component.name + "\")");
16:      buffer.append("\n");
17:
18:      // Generate Method Signature Tag and Data Field
19:      buffer.append(indent( ) + "private int parse" +
20:      CodeGenerationUtils.normalizeFieldName(component.name) +
21:      "(byte[ ] buffer, int offset, int max, ParseResult result) throws
XformException {");
22:
23:      buffer.append("\n");
24:      buffer.append("\n");
25:      increaseIndent( );
26:
27:      // Generate local variables
28:      buffer.append(indent( ) + "String name = \"" + component.name +
"\";");
29:      buffer.append("\n");
30:      buffer.append("\n");
31:      buffer.append(indent( ) + "int consumed = 0;");
32:      buffer.append("\n");
33:      buffer.append(indent( ) + "int tagConsumed = 0;");
34:      buffer.append("\n");
35:      buffer.append(indent( ) + "int dataConsumed = 0;");
36:      buffer.append("\n");
37:      buffer.append("\n");
38:
39:
40:      // Generate code that parses tag
41:      buffer.append(indent( ) + "if ( (tagConsumed = " +
tagMethod + ") < 0) {");
42:      buffer.append("\n");
43:      increaseIndent( );
44:
```

-continued

```
45:      // Generate return if tag could not be consumed (returns −1)
46:      buffer.append(indent( ) + "return tagConsumed;");
47:      buffer.append("\n");
48:      decreaseIndent( );
49:      buffer.append(indent( ) + "}");
50:      buffer.append("\n");
51:      buffer.append("\n");
52:
53:      // Generate code to track the bytes consumed during tag processing
54:      buffer.append(indent( ) + "consumed = tagConsumed;");
55:      buffer.append("\n");
56:      buffer.append("\n");
57:
58:      // Generate code to parse data following tag
59:      buffer.append(indent( ) + "if ( (dataConsumed = " +
terminationMethod + ") < 0) {");
60:      buffer.append("\n");
61:      increaseIndent( );
62:
63:      // Generate code that returns −1 if data could not be parsed
successfully
64:      buffer.append(indent( ) + "return dataConsumed;");
65:      buffer.append("\n");
66:      decreaseIndent( );
67:      buffer.append(indent( ) + "}");
68:      buffer.append("\n");
69:      buffer.append("\n");
70:
71:      // If data found increment the byte counter
72:      buffer.append(indent( ) + "consumed += dataConsumed;");
73:      buffer.append("\n");
74:      buffer.append("\n");
75:
76:      // Generate code the represents the body of the parse method
77:      generateCommonFieldBody(buffer, component);
78:      buffer.append("\n");
79:      buffer.append("\n");
80:
81:      // Generate code the returns the total number of bytes consumed
82:      buffer.append(indent( ) + "return consumed;");
83:      buffer.append("\n");
84:      decreaseIndent( );
85:
86:      // Generate closing right brace ending method definition
87:      buffer.append(indent( ) + "}");
88:      buffer.append("\n");
89:
90:      return buffer;
91: }
```

As shown, the method is invoked with a TagAndDataField component (object), and returns a string buffer of the generated Java method for parsing the tag and data field. In operation, the generate method generates code for tag parsing based on tag type, including converting the tag literal into its run-time format. The operation of the method is straightforward. Beginning at line 18, the method generates a method signature (for the Java method that is being generated for this particular object to be parsed). This is followed by program logic that constructs the rest of the generated method. For example, local variables for the method are generated, beginning at line 27. This is followed by program logic that generates Java code to perform the actual parsing for the tag (of the parsed tag and data field), beginning at line 40. Similarly, program logic to generate code for parsing the data following the tag begins at line 58.

An example of an actual generated Java method, created from the above parser "generate" method, is as follows:

```
1:   // Tag and Data Field ("FirstName")
2:   private int parseFirstName(byte[ ] buffer, int offset, int max,
```

```
     ParseResult result)
3:   throws XformException {
4:
5:       String name = "FirstName";
6:
7:       int consumed = 0;
8:       int tagConsumed = 0;
9:       int dataConsumed = 0;
10:
11:      // Parse the tag
12:      if ( (tagConsumed =
Fixed WidthParseStrategy.parseLiteralTag(buffer, offset + consumed,
13:      max, result, name, new byte[ ] {70, 78, 58})) < 0) {
14:          return tagConsumed;
15:      }
16:
17:      // Save number of bytes consumed
18:      consumed = tagConsumed;
19:
20:      // Parse until delimiter found
21:      if ( (dataConsumed =
FixedWidthParseStrategy.parseDelimitedField(buffer, offset +
consumed,
22:      max, result, name, 1, new byte[ ] {44})) < 0) {
23:          // delimiter not found
24:          return dataConsumed;
25:      }
26:
27:      // increment total number of bytes consumed
28:      consumed += dataConsumed;
29:
30:      // Create data type object and add to event queue
31:      DTContext context = new DTContext( );
32:      context.setContextENCODING_S("windows-1252");
33:      DataType datatype = new com.sybase.jtf.xfapi.DTString(buffer,
result.getFieldPosition( ),
34:      result.getLength( ), context);
35:      eventQueue.push(new FieldEvent(name, datatype));
36:
37:      return consumed;
38: }
```

The generated method illustrated above is a "parseFirstName" method that has been created for parsing a "First Name" tag and data field. As shown, the generated method includes program logic for parsing the tag (e.g., beginning at line 11), and program logic for parsing the data (e.g., beginning at line 20) until a corresponding delimiter is found (if any). Having parsed the particular First Name tag and data field at runtime, the generated method may now push a corresponding data type object into an event queue, which is subsequently used to populate the data object.

Figure 10:
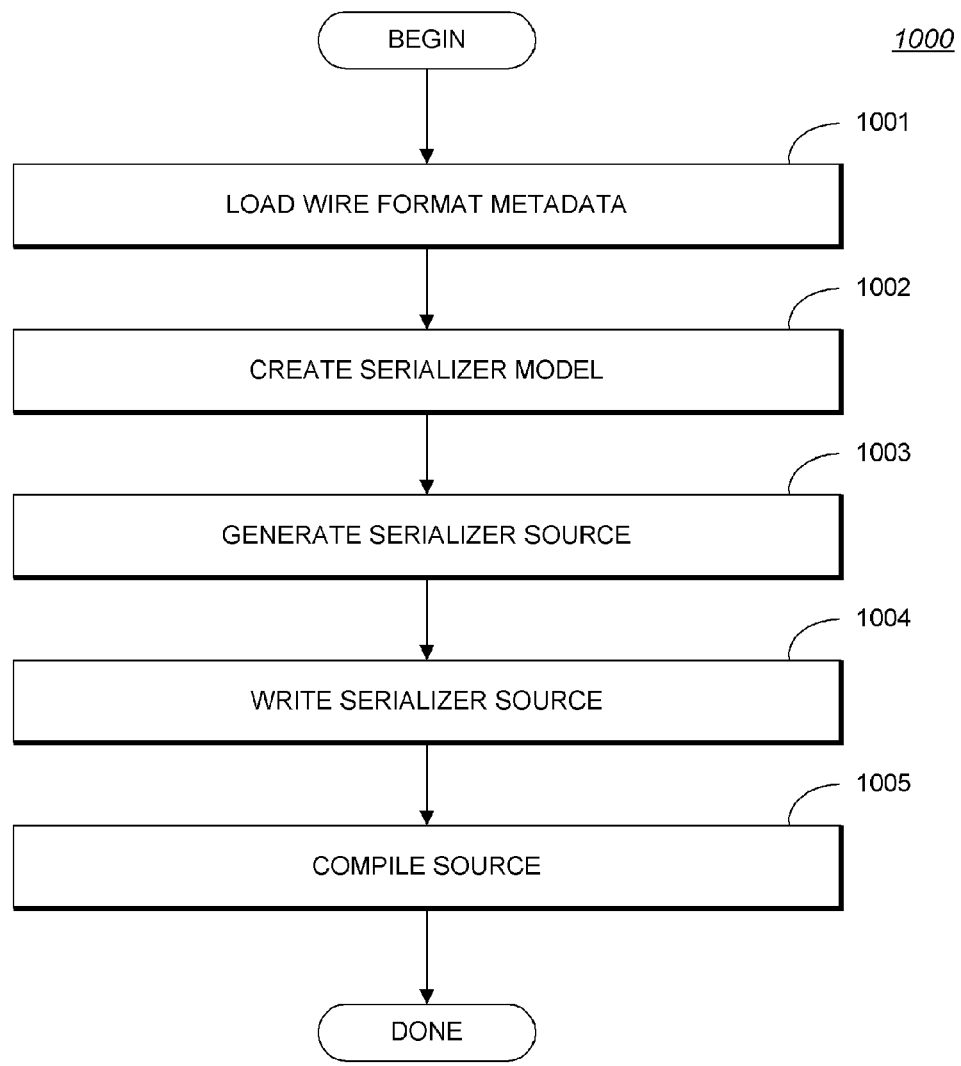
FIG. 10 is a high-level flowchart illustrating a method of the present invention for serializer generation.

FIG. 10 is a high-level flowchart illustrating a method 1000 of the present invention for serializer generation. The method 1000 operates in an analogous manner to that of method 900. For example, at step 1001, the method loads and validates wire format metadata, in a similar manner to that done at step 901. (In the currently preferred embodiment, the program logic to validate the metadata file is shared between method 900 and method 1000). From the loaded metadata, a serializer model may now be created in memory, as indicated by step 1002. Specifically, the serializer generator iterates through the metadata to create a generic serializer model that is populated with all of the wire format metadata attributes. Given a data object (i.e., Java Schema Object) that is itself not wire format specific (other then it contains a suitable data and structure), when the data object is passed to a serializer, the serializer simply retrieves data in order from the data object and builds up a corresponding output buffer (i.e., with the appropriate data types and appropriate physical format). For example, for a tagged date/time field having a specific delimited format, the serializer would emit the starting tag, emit the data (e.g., the day, month, year, time) separated by required delimiters (e.g., semicolons), followed by a closing tag. When the output buffer is correct and complete, it is returned to the particular process that invoked the serializer. Typically at this point, the particular process would put the output in a queue (e.g., for transmission), or store the information persistently (e.g., in a database).

The remaining steps correspond to similar steps previously described for method 900. Specifically, the system passes the model on to the serializer code generator which may iterate through the model for generating corresponding serializer source code in a buffer, at step 1003. The generation of source yields a buffer that comprises an entire Java source code file, which in turn represents the particular serializer of interest (for the given wire format under consideration). After generation is complete, the source file is written to the file system, as indicated by step 1004. Subsequently, the source code file (.java) may be compiled into a Java class (.class) file, as indicated by step 1005.

By way of example, a corresponding serializer "generate" method may be constructed as follows, for creating program code for serializing the previously illustrated tag and data field:

```
 1:    public StringBuffer generate(TagAndDelimiterField
component) throws CodeGenerationException {
 2:
 3:      StringBuffer codeBuffer = new StringBuffer("");
 4:
 5:      int indentation = 3;
 6:
 7:      String normalizedComponentName =
CodeGenerationUtils.normalizeFieldName(component.name);
 8:      String outputDataType =
DTProperties.getInternalDataTypeName(component.
outputDatatypeName);
 9:
10:      String jsoGetter = "";
11:      String delimiterInitializer = "";
12:      String tagInitializer = "";
13:
14:
15:      try {
16:        // Generate the "get" call for the field
17:        jsoGetter = jsoGenerator.generateGetter(path(component.name),
"/",
18:           jsoName, indexVariablesForJSOGenerator);
19:      } catch (Exception x) {
20:        throw new
CodeGenerationException(x.getLocalizedMessage());
21:      }
22:
23:      try {
24:        // generate the run-time form of the delimiter
25:        delimiterInitializer =
26:   CodeGenerationUtils.convertHexStringToInitializer(component.
delimiter);
27:      } catch (ConversionException ceD) {
28:        throw new
CodeGenerationException(MessageCatalog.
getFormatted(BAD_HEX_STRING,
29:        new Object[ ] {component.delimiter,
30:                component.name,
31:   ceD.getLocalizedMessage() }));
32:      }
33:      try {
34:        // generate the run-time form of the tag
35:        tagInitializer =
CodeGenerationUtils.convertHexStringToInitializer(component.tag);
36:      } catch (ConversionException ceT) {
37:        throw new
CodeGenerationException(MessageCatalog.getFormatted(
38:          BAD_HEX_STRING, new Object[ ] { component.tag,
39:            component.name, ceT.getLocalizedMessage() }));
```

-continued

```
40:      }
41:
42:      codeLine(codeBuffer, "// begin tagged, delimited field:"
43:        + component.name + ": tag = " + component.tag
44:        + "; delimiter = " + component.delimiter, indentation);
45:
46:      // add performance instrumentation
47:      addPerformanceStart(codeBuffer, component, indentation);
48:      if (component.isOptional) {
49:        codeLine(codeBuffer, "try {", indentation);
50:        indentation++;
51:      }
52:
53:      // generate code for retrieving field data via "get" method
54:      codeLine(codeBuffer, inputDTVariable + " = " + jsoGetter + ";",
indentation);
55:      codeLine(codeBuffer, "if(" + inputDTVariable + " != null) {",
indentation);
56:      indentation++;
57:
58:      // generate code for data type
59:      codeLine(codeBuffer, "context = new DTContext( );",
indentation);
60:      addContextSetters(codeBuffer, component, indentation);
61:      addCustomSerializerField(codeBuffer, component,
indentation);
62:
63:      // generate code that serializes field
64:      codeLine(codeBuffer,
"SerializerAPI.serializeTagAndDelimiterField("
65:        + mainBufferName + "," + outputDTVariable + ", context,",
66:      indentation);
67:      codeLine(codeBuffer, "\tnew byte[ ] " + tagInitializer + ",",
68:      indentation);
69:      codeLine(codeBuffer, "\tnew byte[ ] " + delimiterInitializer +
");"
70:        indentation);
71:
72:      addLoggerDebugFinishedSerializingField(codeBuffer,
73:        component, outputDTVariable, indentation);
74:      indentation--,
75:
76:      // generate code for handling optional & mandatory fields
77:      if (component.isOptional) {
78:        codeLine(codeBuffer,
79:          "} // else: do nothing. this field is optional",
80:          indentation);
81:        indentation--;
82:        codeLine(codeBuffer, "} catch (SerializationException e) {",
83:          indentation);
84:        indentation++;
85:        codeLine(codeBuffer, "// do nothing: this field is optional.",
86:          indentation);
87:        indentation--;
88:        codeLine(codeBuffer, "}", indentation);
89:      } else {
90:        // generate code for handling missing mandatory field
91:        addFieldNotFoundThrowClause(codeBuffer, component,
indentation);
92:      }
93:
94:      // generate performance instrumentation
95:      addPerformanceEnd(codeBuffer, component, indentation);
96:      codeLine(codeBuffer, "// end tagged, delimited field: "
97:        + component.name + "\n", indentation);
98:      return codeBuffer;
99:    }
```

Importantly, the serializer "generate" method generates program code for retrieving field data via a "get" method (i.e., corresponding to object (getter and setter) access methods), beginning at line 16. Code that serializes field values (i.e., returned from the "get" access method invocation) is generated, beginning at line 63. Should the generate method encounter bad input (e.g., malformed hex string), it will throw an exception. At the completion of code generation, the generated Java code is returned in a buffer (codeBuffer).

An example of actual generated Java code, created from the above serializer "generate" method, is as follows:

```
1:   try {
2:     // begin tagged, delimited field: FirstName: tag = 0x464e3a;
       delimiter = 0x2c
3:     logger.perfStart("FirstName",
4:
MessageCatalog.getString
("SERIALIZER_API_DEBUG_FIELD_TAG_DELIMITER"));
5:
6:     inputDataType = theJSO.getFirstName( );
7:
8:     // Check to see if the desired data element exists
9:     if(inputDataType != null) {
10:
11:      // create output context and data type
12:      context = new DTContext( );
13:      context.setContextENCODING_S("windows-1252");
14:      outputDataType = new
com.sybase.jtf.xfapi.DTString(inputDataType, context);
15:      SerializerAPI.serializeTagAndDelimiterField(messageBuffer,
outputDataType, context,
16:         new byte[ ] {70, 78, 58},
17:         new byte[ ] {44});
18:
19:      // Write debug information if debug enabled
20:      logger.debug
("SERIALIZER_DEBUG_FINISHED_SERIALIZING_FIELD",
21:         new Object[ ] {
22:
MessageCatalog.getString
("SERIALIZER_API_DEBUG_FIELD_TAG_DELIMITER"),
23:         "FirstName",
24:         outputDataType.getChars( ) } );
25:   } else {
26:      throw new
27:   SerializationException(MessageCatalog.getFormatted(
28:   "SERIALIZER_API_ERROR_FIELD_NOT_FOUND",
"FirstName") );
29:   }
30:
31:    logger.perfEnd("FirstName",
32:   MessageCatalog.getString
("SERIALIZER_API_DEBUG_FIELD_TAG_DELIMITER"));
```

As shown, the generated code checks to see if the desired data element exists. In the event that it does, the generated code proceeds to create the corresponding output context and data type for serialization. The actual call to perform the serialization occurs at line 15, upon invocation of a serializeTagAndDelimiterField routine.

Advantages: Applications of Transformation Technology

Integration Broker

Integration brokers provide technology to share data amongst information systems within an enterprise. Typically, integration brokers are built upon message-based middleware. Integration brokers receive data from source nodes, transform the data, and route the data to target nodes. This requires the ability to parse, transform,and serialize data. In most cases, integration broker are stateless. The handling of each inbound message occurs within the context of a single transaction.

Business Process Integration

Business Process Integration (BPI) provides all of the capabilities of an integration broker but does so within the context of a stateful business process. A business process commonly involves communication with several systems, over a variety of transports, with a variety of protocols. For example, a business process may query data from a database, transform the data, and then serialize the data to a queue.

Extract—Transform—Load

Extract—Transform—Load (ETL) solutions are commonly used to move data from one source to another. ETL might be used to move data from a legacy system to a new system. It may also be used to populate a data warehouse. It can also be used to move data from database to database, including performing data scrubbing when necessary. Unlike Integration Brokers and BPI, ETL is often done in batch.

Electronic Data Interchange

EDI Servers read, parse, transform, and serialize records, often producing files as output. Parsers can be used to deserialize EDI records, and Serializers can be used convert in memory objects into EDI records.

Database Messaging

Databases may be allowed to interface directly with messaging systems. For example, an insert in a database table might lead to the creation of a message that is placed on a queue.

Data Producing Applications

Data producing applications provide data for other applications and databases. For example, the data producing application might be a user interface that collects information for a credit application. This data could then be serialized and place on a queue to be routed to one or more back-end systems.

Data Consuming Applications

Data consuming applications receive data from other systems. For example, a user interface might be used to display real-time information regarding objects in orbit around the earth. The data source might be an application that reads sensor data and then propagates the data to a monitoring console.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A computer-implemented method for designing and compiling custom runtime components that provide improved processing of certain types of messages that comprise data objects serialized for transmission from one system to another, the method comprising:

in a graphical user interface, receiving design-time input from a user for characterizing logical structure and physical structure of a particular message type in serialized form;

based on said design-time input, creating metadata in markup language format that characterizes the logical structure and physical structure of the particular message type in serialized form;

based on the metadata, automatically generating source code for de novo creation of custom runtime components comprising newly created custom source code that is highly optimized for runtime processing of said particular message type; and compiling the source code to create said custom runtime components for deployment in a runtime environment, so that at runtime, messages of the particular message type are processed with said custom runtime components in a manner that is highly optimized for the particular message type.

2. The method of claim 1, wherein said custom runtime components include a generated parser for parsing message data.

3. The method of claim 2, wherein said custom runtime components include a generated serializer for serializing parsed message data.

4. The method of claim 1, wherein the metadata includes information about a format specification for the particular message type.

5. The method of claim 1, wherein the metadata includes logical structure and physical structure information about the particular message type.

6. The method of claim 1, wherein the metadata itself is represented as an XML markup file.

7. The method of claim 1, wherein said receiving input step comprises:
displaying a message designer allowing a user to modify attributes of the metadata.

8. The method of claim 1, wherein the custom runtime components are optimized to eliminate unnecessary conversion of message elements at runtime.

9. The method of claim 1, wherein the custom runtime components are optimized to capture at design time a given coded character set relevant to the particular message type, thereby eliminating querying for the coded character set at runtime.

10. The method of claim 1, wherein the custom runtime components are optimized to decrease unnecessary conditional logic from execution at runtime.

11. The method of claim 1, wherein the custom runtime components defer performing data validation on messages, until necessary.

12. The method of claim 1, wherein the custom runtime components defer performing data formatting on messages, until necessary.

13. The method of claim 12, wherein the custom runtime components pass through message data that does not require data formatting, so that such message data is instead simply forwarded to other systems.

14. The method of claim 1, wherein processing of messages at runtime includes parsing message data, and wherein only a single copy of parsed message data is maintained in memory.

15. A computer-readable medium having processor-executable instructions for performing the method of claim 1.

16. A downloadable set of processor-executable instructions for performing the method of claim 1.

17. A computer-implemented system providing optimized processing of messages, the system comprising:
a computer having at least one processor and a memory;
metadata, created at design time based on user input received in a graphical user interface, comprising markup language information for characterizing logical structure and physical structure of a particular message type in serialized form;
a designer module for generating source code in response to said metadata, said source code for de novo creation of custom runtime components comprising newly created custom source code that is highly optimized for runtime processing of said particular message type; and
a compiler for compiling the source code into said custom runtime components, so that in a runtime environment deploying said runtime components the messages are processed by said runtime components in a manner that is highly optimized for the particular message type.

18. The system of claim 17, wherein said custom runtime components include a generated parser for parsing message data.

19. The system of claim 18, wherein said custom runtime components include a generated serializer for serializing parsed message data.

20. The system of claim 17, wherein the metadata includes information about a format specification for the particular message type.

21. The system of claim 17, wherein the metadata includes logical structure and physical structure information about the particular message type.

22. The system of claim 17, wherein the metadata itself is represented as an XML markup file.

23. The system of claim 17, wherein said designer module includes:
a message designer allowing a user to modify attributes of the metadata.

24. The system of claim 17, wherein the custom runtime components are optimized to eliminate unnecessary conversion of message elements at runtime.

25. The system of claim 17, wherein the custom runtime components are optimized to capture at design time a given coded character set relevant to the particular message type, thereby eliminating querying for the coded character set at runtime.

26. The system of claim 17, wherein the custom runtime components are optimized to decrease unnecessary conditional logic from execution at runtime.

27. The system of claim 17, wherein the custom runtime components defer performing data validation on messages, until necessary.

28. The system of claim 17, wherein the custom runtime components defer performing data formatting on messages, until necessary.

29. The system of claim 28, wherein the custom runtime components pass through message data that does not require data formatting, so that such message data is instead simply forwarded to other systems.

30. The system of claim 17, wherein processing by the custom runtime components includes parsing message data, and wherein only a single copy of parsed message data is maintained in memory.

31. A computer-implemented method for designing and compiling custom runtime components that provide improved for processing messages, the method comprising:
in a graphical user interface, receiving design-time input from a user for characterizing logical structure and physical structure of a particular message type in serialized form;
based on said design-time input, creating metadata comprising markup language information that characterizes the logical structure and physical structure of the particular message type in serialized form;
analyzing the new metadata created at design time for the particular message type; and
based on the metadata, dynamically generating and compiling new source code into custom message handling components that are highly optimized for runtime processing of the particular message type, so that the dynamically generated custom message handling components, when deployed in a runtime environment, process the messages in a manner that is highly optimized manner for the particular message type.

32. The method of claim 31, wherein said generating step includes:
generating source code for a parser specifically optimized for parsing messages of said particular message type.

33. The method of claim 32, wherein said generating step includes:

generating source code for a serializer specifically optimized for serializing message data parsed from messages of said particular message type.

34. The method of claim 31, wherein literal values from the metadata are compiled into said components in binary form, thereby eliminating runtime loading of metadata for reading the literal values.

35. The method of claim 31, wherein said metadata includes a wire format specification for the particular message type.

36. The method of claim 35, wherein the wire format specification includes attribute information selected from a set comprising data types, tags, field delimiters, container delimiters, and coded character sets.

37. A method for dynamically creating de novo customized message processing components, the method comprising:
   in a graphical user interface, receiving design-time input from a user that characterizes a particular wire format used to serialize messages;
   based on said design-time input, authoring information comprising markup language information that characterizes the particular wire format used to serialize messages;
   passing said information about the particular wire format to a parser generator, which creates a first set of new source code for a customized parser component;
   passing said information to a serializer generator, which creates a second set of new source code for a customized serializer component; and
   compiling said first and second sets of new source code, for generating runtime versions of the customized parser and the customized serializer components, wherein said runtime versions of the customized parser and said customized serializer components may be deployed for runtime processing of messages in a manner that is highly optimized for said particular wire format.

38. The method of claim 37, wherein at runtime a data object is created that is populated with parsed message data received from said customized parser component.

39. The method of claim 38, wherein the data object is then serialized by the customized serializer component, for transmitting parsed message data to another system.

40. The method of claim 39, wherein the data object is itself not specific to a particular wire format.

41. A system for processing messages comprising:
   a computer having at least one processor and a memory;
   a graphical message designer, for receiving input from a user for characterizing logical structure and physical structure of a particular message type in serialized form;
   metadata, comprising markup language information generated from said design-time input, for characterizing the logical structure and physical structure of the particular message type in serialized form; and
   code generation modules for automatically generating de novo source code, based on the metadata, that compiles into custom message handling components that are highly optimized for runtime processing of the particular message type, so that a runtime environment may employ the components for processing messages of said particular message type in a highly optimized manner.

42. The system of claim 41, wherein the code generation modules include:
   a module for generating source code for a parser specifically optimized for parsing messages of said particular message type.

43. The system of claim 42, wherein the code generation modules include:
   a module for generating source code for a serializer specifically optimized for serializing message data parsed from messages of said particular message type.

44. The system of claim 41, wherein literal values from the metadata are compiled into said components in binary form, thereby eliminating runtime loading of metadata for reading the literal values.

45. The system of claim 41, wherein said metadata includes a wire format specification for the particular message type.

46. A system for dynamically creating new source code that compiles into customized message processing components, the system comprising:
   a computer having at least one processor and a memory;
   a graphical message designer, for receiving design-time input from a user that characterizes a particular wire format used to serialize messages;
   metadata, created based on said design-time input, comprising markup language information that characterizes the particular wire format used to serialize messages;
   a parser generator, responsive to said metadata, for creating a new parser component customized for the particular wire format, and a serializer generator for creating a new serializer component customized for the particular wire format; and
   a runtime environment for deployment of said new parser component and said new serializer component, so that messages of said particular wire format are processed runtime by newly created components specifically customized for that wire format.

47. The system of claim 46, wherein at runtime a data object is created that is populated with parsed message data received from said parser component.

48. The system of claim 47, wherein the data object is then serialized by said serializer component, for transmitting parsed message data to another system.

49. The system of claim 48, wherein the data object is itself not specific to a particular wire format.

50. The system of claim 46, wherein said parser component and said serializer component defer performing data validation and formatting of message data, until necessary.

* * * * *